(12) United States Patent
Malviya et al.

(10) Patent No.: US 11,651,307 B2
(45) Date of Patent: May 16, 2023

(54) SYSTEM AND METHOD FOR AUTOMATIC ORCHESTRATION AND SCHEDULING OF TASK PROCESSING

(71) Applicant: JPMorgan Chase Bank, N.A., New York, NY (US)

(72) Inventors: Bhupendra Malviya, Mumbai (IN); Suraj Vijaykumar Modani, Nandurbar (IN); Neeti Shah, Mumbai (IN); Utkarsh Tiwari, Madhya Pradesh (IN); Kimberley Euphemia Faria, Navi Mumbai (IN); Swapnil Prakash Pednekar, Mumbai (IN); Chetan Shroff, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 263 days.

(21) Appl. No.: 17/093,219

(22) Filed: Nov. 9, 2020

(65) Prior Publication Data
US 2022/0147893 A1 May 12, 2022

(51) Int. Cl.
*G06F 3/0482* (2013.01)
*G06Q 10/0631* (2023.01)
*H04L 9/40* (2022.01)

(52) U.S. Cl.
CPC ........ *G06Q 10/06311* (2013.01); *H04L 63/08* (2013.01); *H04L 63/105* (2013.01); *G06F 3/0482* (2013.01)

(58) Field of Classification Search
CPC . G06Q 10/06311; G06F 3/0482; H04L 63/08; H04L 63/105
See application file for complete search history.

(56) References Cited

U.S. PATENT DOCUMENTS

| 11,144,878 | B1 * | 10/2021 | Mills | G06Q 10/063114 |
| 11,164,121 | B1 * | 11/2021 | Snider | G06Q 10/063118 |
| 2012/0072817 | A1 * | 3/2012 | Dubey | G06F 16/248 |
| | | | | 715/205 |
| 2014/0229221 | A1 * | 8/2014 | Shih | G06Q 10/06312 |
| | | | | 705/7.23 |
| 2019/0057354 | A1 * | 2/2019 | McKenzie | G06Q 50/08 |

(Continued)

*Primary Examiner* — Anil K Bhargava
(74) *Attorney, Agent, or Firm* — Greenblum & Bernstein, P.L.C.

(57) ABSTRACT

Various methods, apparatuses/systems, and media for automatic orchestration and scheduling of task processing are disclosed. A receiver receives user input from a user onto a user interface (UI). A processor accesses a database to verify role-based access control parameters corresponding to the user's access right; authenticates and authorizes access to the application based on a positive verification; translates the task processing request displayed on the UI of a user computing device into a corresponding action to be executed for completing the task; automatically schedules the action to be completed based on receiving scheduling data inputted onto the UI of the user computing device; automatically triggers a process to complete the task based on the scheduling data corresponding to the action; and automatically notifies a result of task completion data to the client computing device. The processor provides a command line interface to generate base orchestrator template with required dependencies and core functionality.

20 Claims, 8 Drawing Sheets

(56) References Cited

U.S. PATENT DOCUMENTS

| | | | |
|---|---|---|---|
| 2019/0251486 A1* | 8/2019 | Gottemukkala | ............................ G06Q 10/06311 |
| 2020/0026580 A1* | 1/2020 | Bahramshahry | ...... G06F 9/5077 |
| 2021/0129325 A1* | 5/2021 | Yu | ...................... G05B 19/4155 |
| 2021/0173718 A1* | 6/2021 | Patel | ..................... G06F 40/295 |

\* cited by examiner

SYSTEM AND METHOD FOR AUTOMATIC ORCHESTRATION AND SCHEDULING OF TASK PROCESSING

TECHNICAL FIELD

This disclosure generally relates to data processing, and, more particularly, to methods and apparatuses for implementing a framework for enabling orchestration and scheduling of task processes and allowing accelerated automation of manual tasks performed by users that can be managed and monitored either remotely or locally.

BACKGROUND

One may consider sample use cases like a trader needing to know status of trade or a back office agent trying to update or reconcile status of trade from multiple systems. Each of this may require a user to log on to multiple systems each with its own interfacing complexity, access management challenges and invocation of different commands or API (application programming interface) based on information to be extracted or updated. Today, some challenges faced in making these processes may include: multiple applications involved in sourcing required details; many of these applications may be legacy system or application that may not provide APIs or required development may be something in future; APIs exposed by these applications may not be the same across the stack leading to integration complexities; requiring development of multiple interface and input output types depending on the application needs; processes that automate these processing may be isolated and it may be difficult to centrally monitor and track progress of execution, etc.

There may be conventional products that may be available in the market today that may try to solve the above stated problem. However, these conventional products may having one or more of the following shortcomings. For example, these products may be monolithic in nature with limited or no scope for plug-ability with other application. These products may be configured to be operated as a separate run time by themselves and may not assimilate or work as an extension to existing application. The available products may be used only as a whole. That is, a part of product may not be reused and integrated with other system. Hence, even if it is asked to automate using a limited set of feature, entire product needs to be purchased and deployed, thereby making the overall deployment heavy and non-modular.

Also, conventional products may have a tight coupling with underlying infrastructure and other modules. Products may work with specific version of operating system (OS), databases, and other modules that come integrated as part of the product, thereby limiting the portability of overall solution and coupling the product with specific OS. In addition, conventional products may not support multiple deployment strategy like physical server, VSI (virtual server infrastructure), containers, cloud infrastructure, etc. Thus, portability of developed solution across different infrastructures may not easily achievable. Conventional products may also not provide for monitoring of transaction outside the system boundary. Monitoring capabilities may be restricted to execution within the conventional product. Thus, monitoring of action outside the system boundary may not be possible.

Further, available products may not support modern application development principles like automated code quality checks, testing, and deployment, etc. One may need to acquire knowledge of the product to develop, thereby providing limited inoperability between skill sets. Additionally, these conventional products may not provide in built capability to interface with contact center solutions like chat engine and interactive voice response.

SUMMARY

The present disclosure, through one or more of its various aspects, embodiments, and/or specific features or sub-components, provides, among other features, various systems, servers, devices, methods, media, programs, and platforms for automatic orchestration and scheduling of task processing, thereby allowing accelerated automation of manual tasks performed by users that can be managed and monitored either remotely or locally, but the disclosure is not limited thereto. The present disclosure, through one or more of its various aspects, embodiments, and/or specific features or sub-components, also provides, among other features, various systems, servers, devices, methods, media, programs, and platforms that also provide reusable automation capability that can be easily plugged with any application/software suite, but the disclosure is not limited thereto. This framework, according to exemplary embodiments, may be an enabler for developing modern applications, providing real time monitoring across multiple systems and technology implementations and providing infrastructure efficiency, but the disclosure is not limited thereto. According to exemplary embodiments, the framework is configured for automation of business processes that are either: i) performed manually by users; ii) involve interaction with multiple system that cannot be easily integrated using available technology solution; or iii) business processes that require manual intervention for decision making based on inputs or processed data, but the disclosure is not limited thereto.

According to exemplary embodiments, this frame work may provide developers with command line interface to generate base orchestrator template with required dependencies and core functionality, e.g., credential management, logging, and integration with code quality tools, etc., but the disclosure is not limited thereto. Developer is expected to only code the required business logic. Mandated design and development standards are pre built in base template.

According to exemplary embodiments, by utilizing this framework, developers may not need to spend any effort for integration with code quality tool, unit test templates, code quality scanning tools and build pipelines.

According to exemplary embodiments, by utilizing this framework, developers may develop an application using highly transferable and hot programming skills compared to non-transferrable product specific skill set.

According to exemplary embodiments, this framework also provide machine learning based automated development, e.g., auto create code workflow based on requirements, but the disclosure is not limited thereto.

According to an aspect of the present disclosure, a method for automatic orchestration and scheduling of task processing by utilizing one or more processors and one or more memories is disclosed. The method may include: receiving user input from a user onto a user interface (UI) of a user computing device in response to a task processing request to be completed by utilizing an application, wherein the task processing request is received from a client computing device; accessing a database to verify role-based access control parameters corresponding to the user's access right; authenticating and authorizing access to the application based on a positive verification; translating the task processing request displayed on the UI of the user computing device into a corresponding action to be executed for completing the task; automatically scheduling the action to be completed based on receiving scheduling data inputted onto the UI of the user computing device; automatically triggering a process to complete the task based on the scheduling data corresponding to the action; and automatically notifying a result of task completion data to the client computing device.

According to a further aspect of the present disclosure, the method may further include: integrating the UI with a plurality of different configurable dashboards providing a centralized monitoring and analytics capabilities.

According to yet another aspect of the present disclosure, the method may further include: creating additional parameters on the fly to process the task request based on links provided by the plurality of different configurable dashboards depending on a desired use case; and automatically completing the task by implementing the additional parameters.

According to a further aspect of the present disclosure, the method may further include: receiving and scheduling a plurality of tasks; batch processing the plurality of tasks; and monitoring status of each task by utilizing the plurality of different configurable dashboards.

According to another aspect of the present disclosure, the method may further include: simultaneously accessing a plurality of different infrastructures for completing the plurality of tasks based on corresponding scheduling data.

According to yet another aspect of the present disclosure, the plurality of different infrastructures may include one or more of the following: a cloud-based infrastructure and a virtual server infrastructure.

According to an additional aspect of the present disclosure, the method may further include: configuring the application by utilizing principles of modularity, loose coupling, and reusability that renders high degree of plug-ability within the application and reusability of developed modules with any other application.

According to yet another aspect of the present disclosure, the method may further include: collecting real time execution data corresponding to the task from the application and from other system outside of the application, and monitoring, in real time, activities of task processing from within and outside of the system boundary based on the real time execution data.

According to another aspect of the present disclosure, the method may further include: configuring the application in a manner such that the application can support execution of automation tasks in either client-server (un-attended) mode or standalone client (attended) mode.

According to a further aspect of the present disclosure, a system for automatic orchestration and scheduling of task processing is disclosed. The system may include a receiver configured to receive user input from a user onto a user interface (UI) of a user computing device in response to a task processing request to be completed by utilizing an application, wherein the task processing request is received from a client computing device; and a processor operatively connected with the receiver via a communication network. The processor may be configured to: access a database to verify role-based access control parameters corresponding to the user's access right, authenticate and authorize access to the application based on a positive verification; translate the task processing request displayed on the UI of the user computing device into a corresponding action to be executed for completing the task; automatically schedule the action to be completed based on receiving scheduling data inputted onto the U of the user computing device, automatically trigger a process to complete the task based on the scheduling data corresponding to the action; and automatically notify a result of task completion data to the client computing device.

According to another aspect of the present disclosure, the processor may be further configured to integrate the UI with a plurality of different configurable dashboards providing a centralized monitoring and analytics capabilities.

According to yet another aspect of the present disclosure, the processor may be further configured to: create additional parameters on the fly to process the task request based on links provided by the plurality of different configurable dashboards depending on a desired use case; and automatically complete the task by implementing the additional parameters.

According to an aspect of the present disclosure, wherein the processor may be further configured to: receive and schedule a plurality of tasks; batch process the plurality of tasks; and monitor status of each task by utilizing the plurality of different configurable dashboards.

According to a further aspect of the present disclosure, the processor may be further configured to: simultaneously access a plurality of different infrastructures for completing the plurality of tasks based on corresponding scheduling data.

According to an additional aspect of the present disclosure, the processor may be further configured to: configure the application by utilizing principles of modularity, loose coupling, and reusability that renders high degree of plug-ability within the application and reusability of developed modules with any other application.

According to yet another aspect of the present disclosure, the processor may be further configured to: configure the application in a manner such that the application can support execution of automation tasks in either client-server (un-attended) mode or standalone client (attended) mode.

According to a further aspect of the present disclosure, the processor may be further configured to: collect real time execution data corresponding to the task from the application and from other system outside of the application; and monitor, in real time, activities of task processing from within and outside of the system boundary based on the real time execution data.

According to another aspect of the present disclosure, a non-transitory computer readable medium configured to store instructions for automatic orchestration and scheduling of task processing is disclosed. The instructions, when executed, may cause a processor to perform the following: causing a receiver to receive user input from a user onto a user interface (UI) of a user computing device in response to a task processing request to be completed by utilizing an application, wherein the task processing request is received from a client computing device; accessing a database to verify role-based access control parameters corresponding to the user's access right; authenticating and authorizing access to the application based on a positive verification; translating the task processing request displayed on the UI of the user computing device into a corresponding action to be executed for completing the task; automatically scheduling the action to be completed based on receiving scheduling data inputted onto the UI of the user computing device; automatically triggering a process to complete the task based on the scheduling data corresponding to the action; and automatically notifying a result of task completion data to the client computing device.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
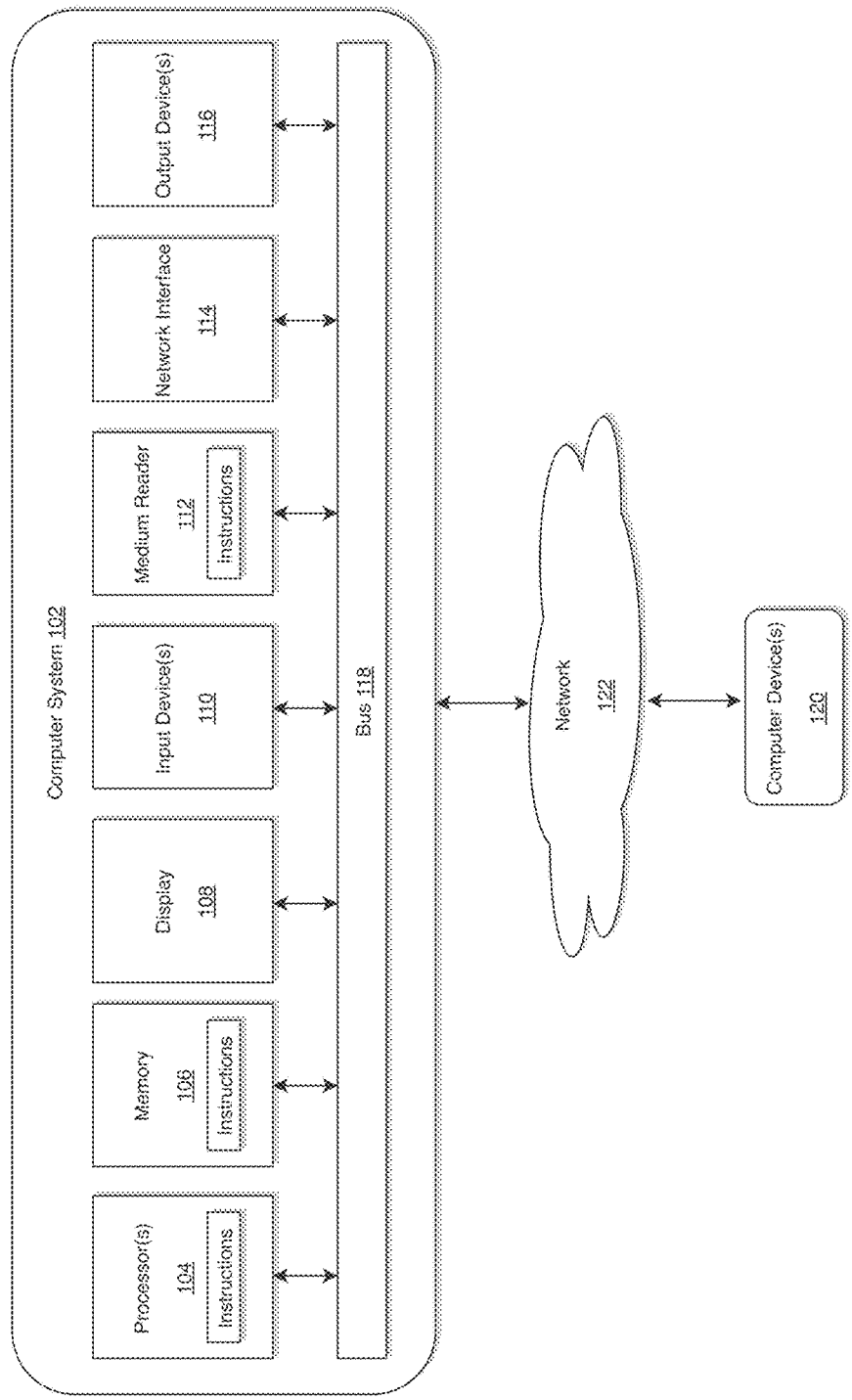
FIG. 1 illustrates a computer system for implementing an orchestration and scheduling framework module accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU, a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an orchestration and scheduling framework module for automatic orchestration and scheduling of task processing, thereby allowing accelerated automation of manual tasks performed by users that can be managed and monitored either remotely or locally, but the disclosure is not limited thereto.

Figure 2:
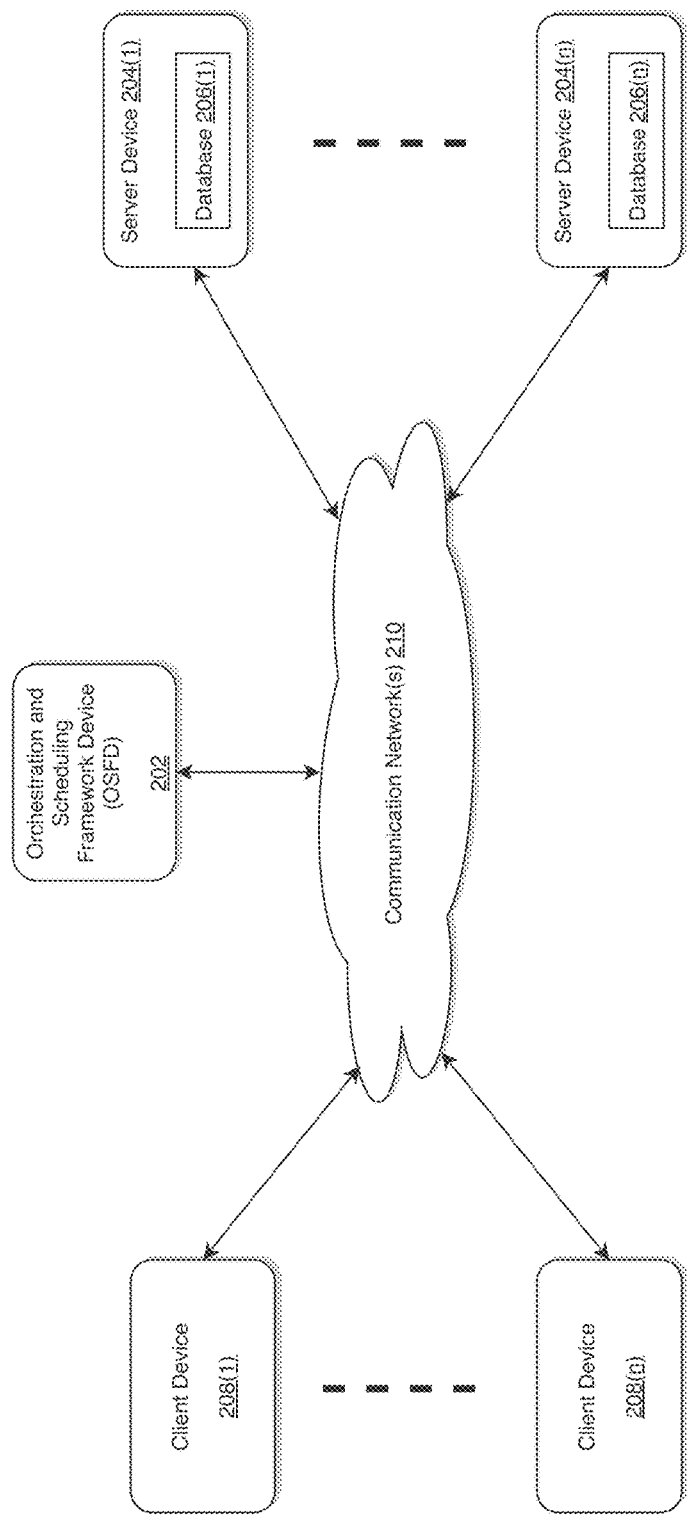
FIG. 2 illustrates an exemplary diagram of a network environment with an orchestration and scheduling framework device in accordance with an exemplary embodiment.

Referring to FIG. 2, a schematic of an exemplary network environment 200 for implementing an orchestration and scheduling framework device (OSFD) of the instant disclosure is illustrated.

According to exemplary embodiments, the above-described problems associated with conventional testing system may be overcome by implementing an OSFD 202 having an orchestration and scheduling framework module as illustrated in FIG. 2 by allowing accelerated automation of manual tasks performed by users that can be managed and monitored either remotely or locally, but the disclosure is not limited thereto. According to exemplary embodiments, the OSFD 202 may also provide reusable automation capability that can be easily plugged with any application/software suite, but the disclosure is not limited thereto. The framework implemented by the OSFD 202, according to exemplary embodiments, may be an enabler for developing modern applications, providing real time monitoring across multiple systems and technology implementations and providing infrastructure efficiency, but the disclosure is not limited thereto. According to exemplary embodiments, the framework implemented by the OSFD 202 may be configured for automation of business processes that are either; i) performed manually by users; ii) involve interaction with multiple system that cannot be easily integrated using available technology solution, or iii) business processes that require manual intervention for decision making based on inputs or processed data, but the disclosure is not limited thereto.

According to exemplary embodiments, the framework implemented by the OSFD 202 may be developed using principles of modularity, loose coupling and reusability that renders high degree of plug-ability within the application and reusability of developed modules with any other application, but the disclosure is not limited thereto. Further, according to exemplary embodiments, the framework implemented by the OSFD 202 may support execution of automation tasks in either client-server (un-attended) or stand-alone client (attended) mode, but the disclosure is not limited thereto. Also, the framework implemented by the OSFD 202 may provide front end integration with known chat interfaces, and/or interactive voice response (IVR) interfaces, but the disclosure is not limited thereto. In addition, according to exemplary embodiments, the framework implemented by the OSFD 202 may provide mechanism for collection of real time execution data from the application and also from other system, thereby enabling real-time activity monitoring from within and outside the system boundary, but the disclosure is not limited thereto.

The OSFD 202 may be the same or similar to the computer system 102 as described with respect to FIG. 1.

The OSFD 202 may store one or more applications that can include executable instructions that, when executed by the OSFD 202, cause the OSFD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the OSFD 202 itself, may be located in virtual server(s) running in a cloud-based computing environment rather than being tied to one or more specific physical network computing devices. Also, the application(s) may be running in one or more virtual machines (VMs) executing on the OSFD 202. Additionally, in one or more embodiments of this technology, virtual machine(s) running on the OSFD 202 may be managed or supervised by a hypervisor.

In the network environment 200 of FIG. 2, the OSFD 202 is coupled to a plurality of server devices 204(1)-204(n) that hosts a plurality of databases 206(1)-206(n), and also to a plurality of client devices 208(1)-208(n) via communication network(s) 210. A communication interface of the OSFD 202, such as the network interface 114 of the computer system 102 of FIG. 1, operatively couples and communicates between the OSFD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the OSFD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The OSFD 202 may be a standalone device or integrated with one or more other devices or apparatuses, such as one or more of the server devices 204(1)-204(n), for example. In one particular example, the OSFD 202 may be hosted by one of the server devices 204(1)-204(n), and other arrangements are also possible. Moreover, one or more of the devices of the OSFD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the OSFD 202 via the communication network(s) 210 according to the HTTP-based protocol and/or JavaScript Object Notation (JSON) file format based protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of die network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the OSFD 202 that may be configured for automatic orchestration and scheduling of task processing, but the disclosure is not limited thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the OSFD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the OSFD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the OSFD 202, the server devices 204(1)-204(n), or the client devices 208(1)-208(n), for example, may be configured to operate as virtual instances on the same physical machine. For example, one or more of the OSFD 202, the server devices 204(1)-204(n), or the client devices 208(1)-208(n) may operate on the same physical device rather than as separate devices communicating through communication network(s) 210. Additionally, there may be more or fewer OSFDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
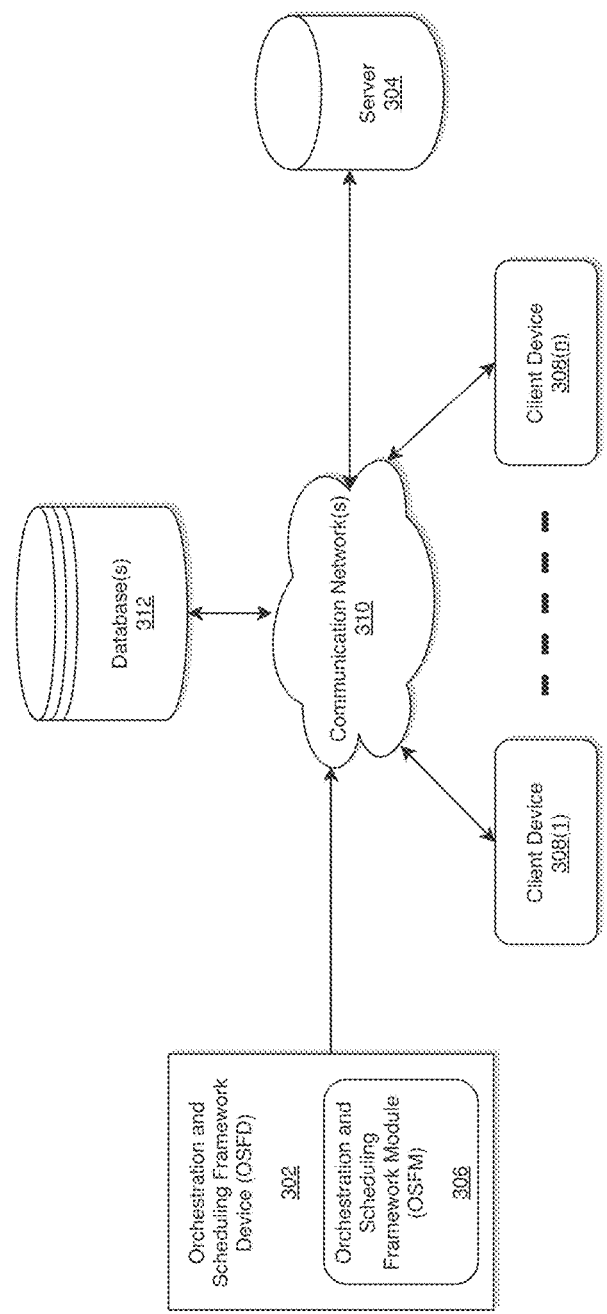
FIG. 3 illustrates a system diagram for implementing an orchestration and scheduling framework device with an orchestration and scheduling framework module in accordance with an exemplary embodiment.

FIG. 3 illustrates a system diagram for implementing an orchestration and scheduling framework device (OSFD) with an orchestration and scheduling framework module (OSFM) in accordance with an exemplary embodiment.

As illustrated in FIG. 3, the OSFD 302 including the OSFM 306 may be connected to a server 304, and a database(s) 312 via a communication network 310. The OSFD 302 may also be connected to a plurality of client devices 308(1)-308(n) via the communication network 310, but the disclosure is not limited thereto. According to exemplary embodiments, the OSFM 306 may be implemented within the client devices 308(1)-308(n), but the disclosure is not limited thereto. According to exemplary embodiments, the client devices 308(1)-308(n) may be utilized by software application developers, but the disclosure is not limited thereto.

According to exemplary embodiment, the OSFD 302 is described and shown in FIG. 3 as including the OSFM 306, although it may include other rules, policies, modules, databases, or applications, for example. According to exemplary embodiments, the database(s) 312 may be embedded within the OSFD 302. Although only one database(s) 312 is illustrated in FIG. 3, according to exemplary embodiments, a plurality of database(s) 312 may be provided. The database(s) 312 may include one or more memories configured to store information including: rules, programs, production requirements, configurable threshold values defined by a product team to validate against service level objective (SLO), test cases, test scenarios, production robots (i.e., modules programmed to perform a particular task in testing a software application) framework templates, etc., but the disclosure is not limited thereto. According to exemplary embodiments, the OSFM 306 may be configured to be storage platform agnostic—configured to be deployed across multiple storage layers.

According to exemplary embodiments, the OSFM 306 may be configured to receive continuous feed of data from the database(s) 312 via the communication network 310.

As will be described below, the OSFM 306 may be configured to create a plurality of production robots each configured to cause a receiver to receive user input from a user onto a user interface (UI) of a user computing device in response to a task processing request to be completed by utilizing an application, wherein the task processing request is received from a client computing device; access the database(s) 312 to verify role-based access control parameters corresponding to the user's access right; authenticate and authorize access to the application based on a positive verification, translate the task processing request displayed on the UI of the user computing device into a corresponding action to be executed for completing the task; automatically schedule the action to be completed based on receiving scheduling data inputted onto the UI of the user computing device, automatically trigger a process to complete the task based on the scheduling data corresponding to the action; and automatically notify a result of task completion data to the client computing device, but the disclosure is not limited thereto.

The plurality of client devices 308(1)-308(n) are illustrated as being in communication with the OSFD 302. In this regard, the plurality of client devices 308(1)-308(n) may be "clients" of the OSFD 302 and are described herein as such. Nevertheless, it is to be known and understood that the plurality of client devices 308(1)-308(n) need not necessarily be "clients" of the OSFD 302, or any entity described in association therewith herein. Any additional or alternative relationship may exist between either or more of the plurality of client devices 308(1)-308(n) and the OSFD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the OSFD 302 via broadband or cellular communication. Of course, these embodiments are merely exemplary and are not limiting or exhaustive.

Figure 4:
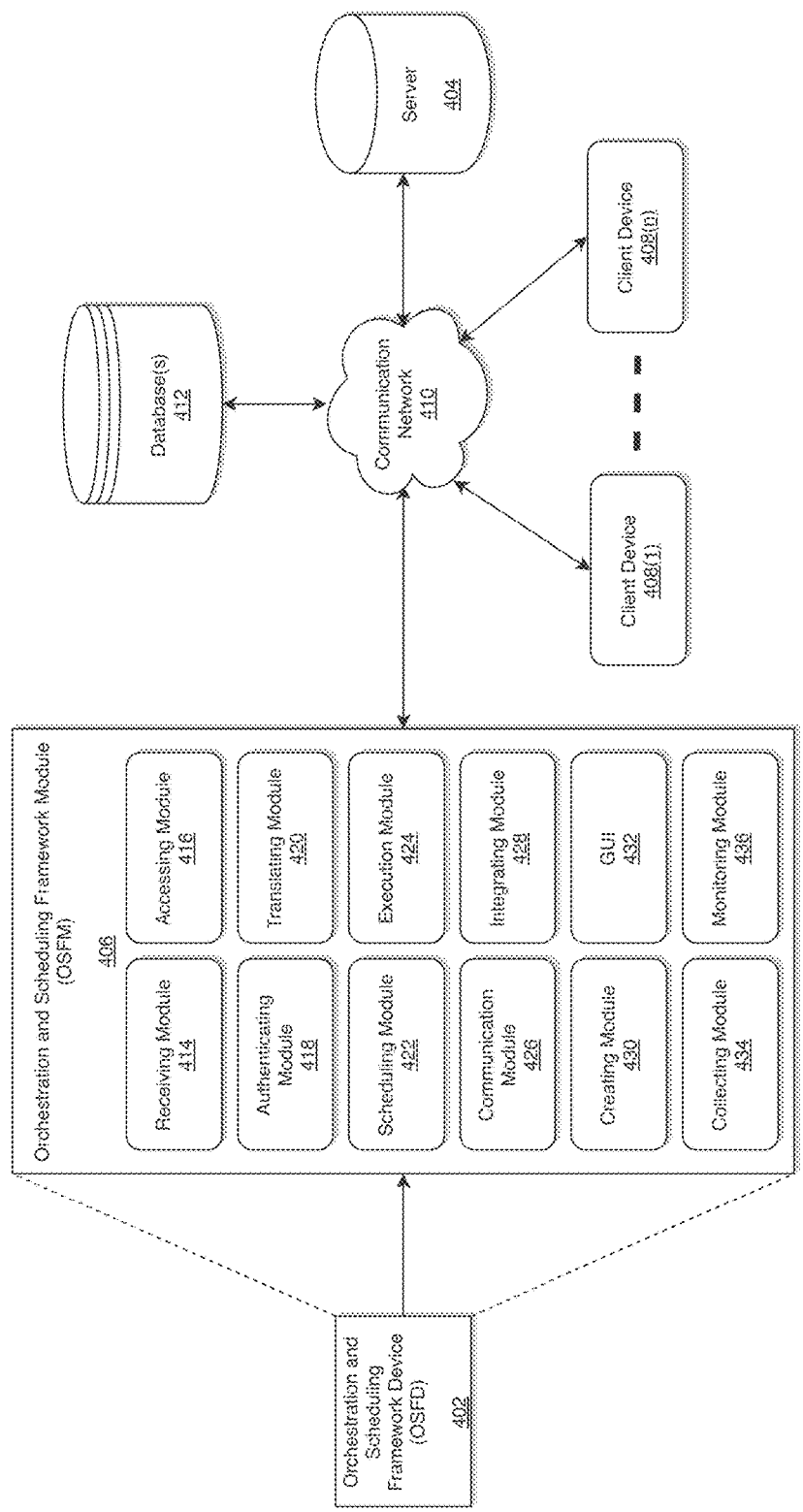
FIG. 4 illustrates a system diagram for implementing an orchestration and scheduling framework module of FIG. 3 in accordance with an exemplary embodiment.

FIG. 4 illustrates a system diagram for implementing an orchestration and scheduling framework module of FIG. 3 in accordance with an exemplary embodiment. As illustrated in FIG. 4, the system 400 may include an orchestration and scheduling framework device (OSFD) 402 within which an orchestration and scheduling framework module (OSFM) 406 may be embedded, a database(s) 412, a server 404, client devices 408(1)-408(n), and a communication network 410. According to exemplary embodiments, the OSFD 402, OSFM 406, database(s) 412, the server 404, the client devices 408(1)-408(n), and the communication network 410 as illustrated in FIG. 4 may be the same or similar to the OSFD 302, the OSFM 306, the database(s) 312, the server 304, the client devices 308(1)-308(n), and the communication network 310, respectively, as illustrated in FIG. 3.

Figure 5:
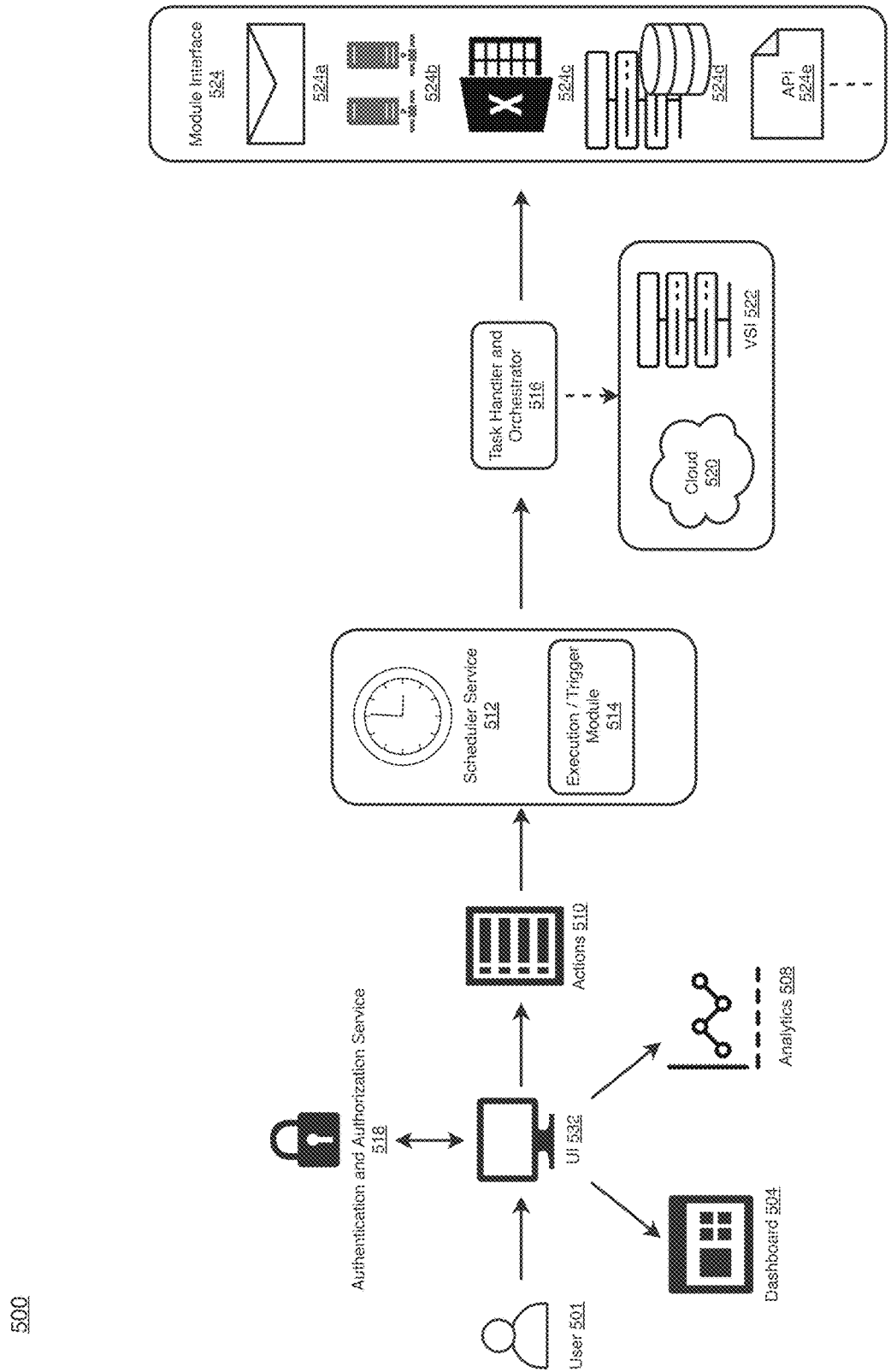
FIG. 5 illustrates an exemplary block diagram of a use case in accordance with an exemplary embodiment.
Figure 6:
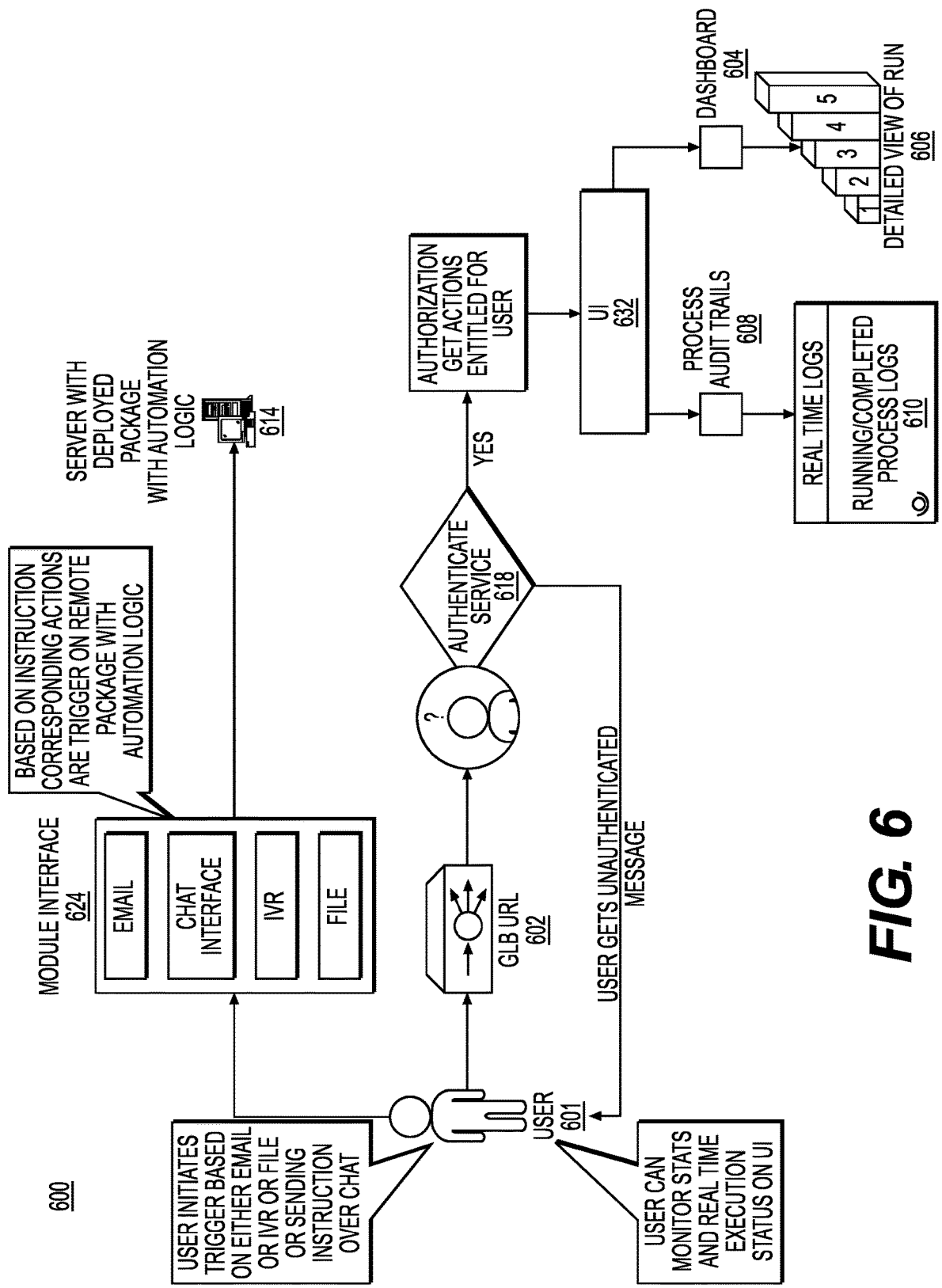
FIG. 6 illustrates an exemplary user interaction diagram of a use case in accordance with an exemplary embodiment.
Figure 7:
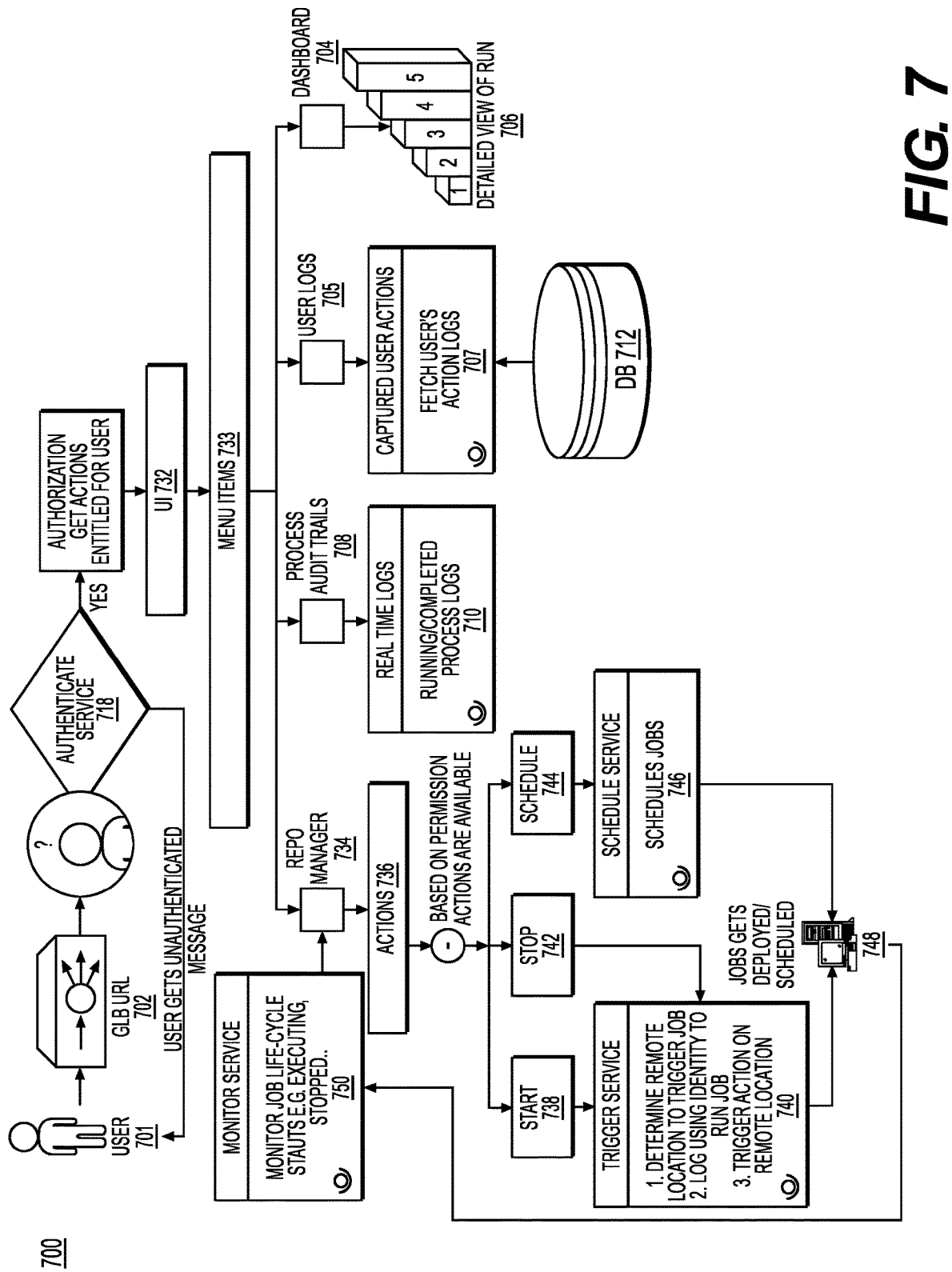
FIG. 7 illustrates another exemplary user interaction diagram of a use case in accordance with an exemplary embodiment.

FIG. 5 illustrates an exemplary block diagram of a use case in accordance with an exemplary embodiment. FIG. 6 illustrates an exemplary user interaction diagram of a use case in accordance with an exemplary embodiment. FIG. 7 illustrates another exemplary user interaction diagram of a use case in accordance with an exemplary embodiment.

Referring to FIGS. 5-7, an exemplary use case may involve trading and a trader (i.e., client) by request status of a trade by utilizing a client device (e.g., client devices 408(1)-408(n) as illustrated in FIG. 4).

Without automation (as in conventional systems), trader would usually email or call up a back office agent to know the status of trade. Back office agent may require to login to multiple systems, for example, App1 built on Mainframe, App2 build using some Desktop technology, and App3 build using modem programming language that support API. For an end-to-end automated solution the application will have to integrate with mainframes, desktop application and API. Interfacing with Mainframe and Desktop applications is difficult as they are developed to be used for human interaction and not programmatic access. Even if some solution is developed, it may be very use case specific and may not be scaled to other use cases.

In contrast to the conventional systems, the OSFM 406 may be configured to provide a generic integration interface that provide configuration driven capability to programmatically access these systems, but the disclosure is not limited thereto. To automate the above use case, a developer i) may use a base orchestrator (provided by the OSFM 406) and use the generic integration interface for mainframe, desktop and API; ii) may be provided with the required configuration that contains connection details and actions to be performed on mainframe, desktop and API to fetch trade details; iii) create a standard output; and iv) respond back to the client, etc., but the disclosure is not limited thereto.

Further details will be provided below with respect to FIGS. 4-7. As illustrated in FIG. 4, the OSFM 406 may include a receiving module 414, an accessing module 416, an authenticating module 418, a translating module 420, a scheduling module 422, an execution module 424, a communication module 426, an integrating module 428, a creating module 430, a GUI 432, a collecting module 434, and a monitoring module 432. According to exemplary embodiments, the database(s) 412 may be external to the OSFD 402 may include various systems that are managed and operated by an organization. Alternatively, according to exemplary embodiments, the database(s) 412 may be embedded within the OSFD 402 and/or the OSFM 406

The process may be executed via the communication network 410, which may comprise plural networks as described above. For example, in an exemplary embodiment, the various components of the OSFM 406 may communicate with the server 404, and the database(s) 412 via the communication network 410. Of course, these embodiments are merely exemplary and are not limiting or exhaustive.

According to exemplary embodiments, the communication network 410 may be configured to establish a link between the database(s) 412, the client devices 408(1)-408(n) and the OSFM 406.

According to exemplary embodiments, each of the receiving module 414, accessing module 416, authenticating module 418, translating module 420, scheduling module 422, execution module 424, communication module 426, integrating module 428, creating module 430, collecting module 434, and the monitoring module 432 may be implemented by microprocessors or similar, they may be programmed using software (e.g., microcode) to perform various functions discussed herein and may optionally be driven by firmware and/or software. Alternatively, each of the receiving module 414, accessing module 416, authenticating module 418, translating module 420, scheduling module 422, execution module 424, communication module 426, integrating module 428, creating module 430, collecting module 434, and the monitoring module 432 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, accessing module 416, authenticating module 418, translating module 420, scheduling module 422, execution module 424, communication module 426, integrating module 428, creating module 430, collecting module 434, and the monitoring module 432 may be physically separated into two or more interacting and discrete blocks, units, devices, and/or modules without departing from the scope of the inventive concepts.

As illustrated in FIG. 5, user 501 may request access by utilizing the UI 532. The UI 532 may be in a two-way communication with an authentication and authorization service 518 for authenticating and authorizing the user 501 based on role-based access control. The UI 532 may also be connected to add-on features such as dashboard 504 and analytics 508. The UI 532 may be operatively connected with a scheduler service 512 and an execution/trigger module 514. The scheduler service 512 and execution/trigger module 514 may be operatively connected with a task handler and orchestrator 516 which may access data by establishing communication with a cloud-based interface 520 or a virtual server interface 522. The task handler and orchestrator 516 may be operatively connected with a module interface 524 which may provide a plurality of interfaces such as email 524a, chat 524b, Excel 524c, virtual server 524d, API 524e, IVR etc., but the disclosure is not limited thereto.

Referring to FIGS. 4 and 5, according to exemplary embodiments, the receiving module 414 may be configured to receive user input from a user 501 onto a user interface (UI) 532 (or GUI 432) of a user computing device (e.g., the OSFD 402) in response to a task processing request to be completed by utilizing an application, wherein the task processing request is received from a client computing device (e.g., client device 408(1)-408(n)).

According to exemplary embodiments, the accessing module 416 may be configured to access the database(s) 412 and the authentication and authorization service 518 to verify role-based access control parameters corresponding to the user's access right.

According to exemplary embodiments, the authentication module 418 may be configured to authenticate and authorize access to the application based on a positive verification.

According to exemplary embodiments, the translating module 420 may be configured to translate the task processing request displayed on the UI 532 of the user computing device into a corresponding action 510 to be executed for completing the task.

According to exemplary embodiments, the scheduling module 422 (or the scheduler service 512) may be configured to automatically schedule the action to be completed based on receiving scheduling data inputted onto the UI 532 of the user computing device.

According to exemplary embodiments, the execution module 424 (or the execution/trigger module 514) may be configured to automatically trigger a process to complete the task based on the scheduling data corresponding to the action.

According to exemplary embodiments, the communication module 426 may be automatically notifying a result of task completion data to the client computing device by utilizing the module interface 524.

According to exemplary embodiments, the integrating module 428 may be configured to integrate the UI 532 with a plurality of different configurable dashboards 504 and analytics 508 for providing a centralized monitoring and analytics capabilities.

According to exemplary embodiments, the creating module 430 may be configured to create additional parameters on the fly to process the task request based on links provided by the plurality of different configurable dashboards 504 depending on a desired use case and the execution module 424 may be configured to automatically complete the task by implementing the additional parameters.

According to exemplary embodiments, the receiving module 414 and the scheduling module 422 may be configured to receive and schedule a plurality of tasks. The execution module 424 may be configured to batch process the plurality of tasks, and the UI 532 may allow monitoring status of each task by utilizing the plurality of different configurable dashboards 504.

According to exemplary embodiments, accessing module 416 may be configured to simultaneously access a plurality of different infrastructures for completing the plurality of tasks based on corresponding scheduling data.

According to exemplary embodiments, the plurality of different infrastructures may include one or more of the following: a cloud-based infrastructure (cloud 520) and a virtual server infrastructure (VSI 522).

According to exemplary embodiments, the OSFM 406 may configure the application by utilizing principles of modularity, loose coupling, and reusability that renders high degree of plug-ability within the application and reusability of developed modules with any other application.

According to exemplary embodiments, the collecting module 434 may be configured to collect real time execution data corresponding to the task from the application and from other system outside of the application; and the UI 532 may allow monitoring, in real time, activities of task processing from within and outside of the system boundary based on the real time execution data.

According to exemplary embodiments, the OSFM 406 may configure the application in a manner such that the application can support execution of automation tasks in either client-server (un-attended) mode or standalone client (attended) mode.

FIG. 6 illustrates a user interaction diagram in case of Chat or IVR or Email or File based trigger. Referring to FIGS. 5-6, the user 501, 601 may initiate trigger based on either Email or IVR or File or may send instruction over chat. According to exemplary embodiments, based on instructions received from the user 501, 601, corresponding actions 510 may be triggered on remote package with automation logic. As illustrated in FIG. 6, the module interface 624 communicates with server 614 with deployed package with automation logic.

Again referring to FIGS. 5-6, according to exemplary embodiments, user's input is initially passed through GLB URL 602 to determine authenticity of the user 501, 601. The authenticate service 618 determines whether the user 501, 601 is authenticated and authorized to access based on receiving data from GLB URL 602. Once authenticated and authorized, the user 501, 601 may be presented with actions 510 entitled for the user 501, 601 onto the UI 532, 632. The UI 632 may be integrated with dashboard 604 which may provide detailed view of run 606 (e.g., completed runs, failed runs, time taken, task status, etc.) onto the UI 632. The UI 632 may also be integrated with process audit trails 608 which may provide real time logs 610 (e.g., running/completed process logs) onto the UI 632.

According to exemplary embodiments, the user can monitor status and real-time execution status on the UI 532, 632.

According to exemplary embodiments, the package as illustrated in FIG. 6, only uses the modules that are required for the solution hence the package is comparatively light weight compared to monolithic based solutions and more efficient in terms of processor and memory footprint during execution.

Referring to FIGS. 4-6, according to exemplary embodiments, to remove dependency on back office agent, the package as illustrated in FIG. 6 may be integrated with Chat or Email solution so that user 501, 601 can either raise his/her request via a chat interface or send email (see module interface 524, 624). Contents of chat/email may be interpreted by OSFM 406, and based on inputs, information may be extracted from multiple systems and generated response may be sent to client (e.g., trader) without the need of back office agent getting involved.

For second use case where a back office agent is trying to update or reconcile status of trade from multiple systems, agent may have data in some form of excel or pdf files and would like the process to be triggered on a solution deployed on remote server. The OSFM 406 may provide capability to invoke those task using UI or scheduling those jobs to get automatically triggered as per predefined calendar.

FIG. 7 illustrates a user interaction diagram in case of manual or scheduled trigger from UI. As illustrated in FIG. 7, the GLB URL 702, authenticate service 718, UI 732, dashboard 704, detailed view of run 706, process audit trails 708, and the real time logs 710 may be the same or similar to the GLB URL 602, authenticate service 618, UI 632, dashboard 604, detailed view of run 606, process audit trails 608, and the real time logs 610 as respectively illustrated with respect to FIG. 6, and therefore details explanations with reference to these elements will not be repeated herein.

As illustrated in FIG. 7, the UI 732 may generate menu items 733, which may include dashboard 704, user logs 705, process audit trails 708, and responsible manager 734. The user logs 705 may include captured user actions 707 which may fetch user's action logs from a database 712. The responsible manager 734 menu item may layout actions 736 which may include start 738, stop 742, and schedule 744. The start 738 may allow trigger service 740 to determine remote location to trigger job, log using identity to run job, and trigger action on remote location, but the disclosure is not limited thereto. The schedule 744 allow the scheduler service 746 to schedule jobs. Jobs may be deployed or scheduled on the computing device 748. The monitor service 750 allows for monitoring job life-cycle status (e.g., executing, stopped, etc., but the disclosure is not limited thereto).

According to exemplary embodiments, the OSFM 406 may offer various benefits to different stakeholders.

For example, for developers, the OSFM 406 may provide command line interface to generate base orchestrator template with required dependencies and core functionality such as credential management, logging, and integration with code quality tools. Developer is expected to only code the required business logic. Mandated design and development standards may be pre built in base template by the OSFM 406.

For developers, the OSFM 406 may additionally provide the following benefits; zero effort integration with code quality tool, unit test templates, code quality scanning tools and build pipelines, development using highly transferable and the best programming skills compared to non-transferrable product specific skill set, and machine learning based automated development—auto create code workflow based on requirements, but the disclosure is not limited thereto.

For business, the OSFM 406 may provide the following benefits; in house developed automation framework with capability to automate across wide range of business process; year on year savings in terms of license cost; efficiency in terms of infrastructure optimization due to fungible deployment capability of product, but the disclosure is not limited thereto.

For operation users, the OSFM 406 may provide the following benefits; customized bot specific dashboard and monitoring, real time business activity monitoring of transaction lifecycle across the execution stack; and enhanced stability and ease of maintenance, but the disclosure is not limited thereto.

Additional benefits, compared to conventional systems, provided by the OSFM 406 may include: Reuse and Plugability—individual modules of the framework can be used as standalone service without the need for adopting the whole framework; Fungible deployment—can be run on physical, virtual, containers, and cloud environment; machine learning based automated development—recommended and create code workflow based on requirement; subscription endpoint to enable track and trace within and outside the application stack, allowing any application to publish transaction details in standard format to single end point—this service may act as aggregator and may provide end to end traceability of transaction across applications and lobs in real time basis. The OSFM 406 also provide capability of a translation table where system specific unique ID can be mapped to global unique ID for end-to-end tracking.

Additional benefits, compared to conventional systems, provided by the OSFM 406 may include action chain and smart end points. For example, the OSFM 406 may break end-to-end process into low level tasks and host them as smart service endpoints. The OSFM 406 may chain low level tasks fixed at design time or evaluated at run time. The OSFM 406 may publish and smart end points pick up task for executions. Each application in the network may pick up its tasks and submit back to the OSFM 406 with status. Business process chain may decide the next steps and publish it to smart endpoint for next step of execution.

Compared to conventional systems, the OSFM 406 may enable capability extension of third party products that are designed to accomplish domain specific task, in a standardized way without altering the core vendor product. The OSFM 406 may also be used to extend the core capabilities of third party product by providing a standard mechanism to build interfacing mechanisms with other system and providing a platform for holding integration logic and transformation.

Figure 8:
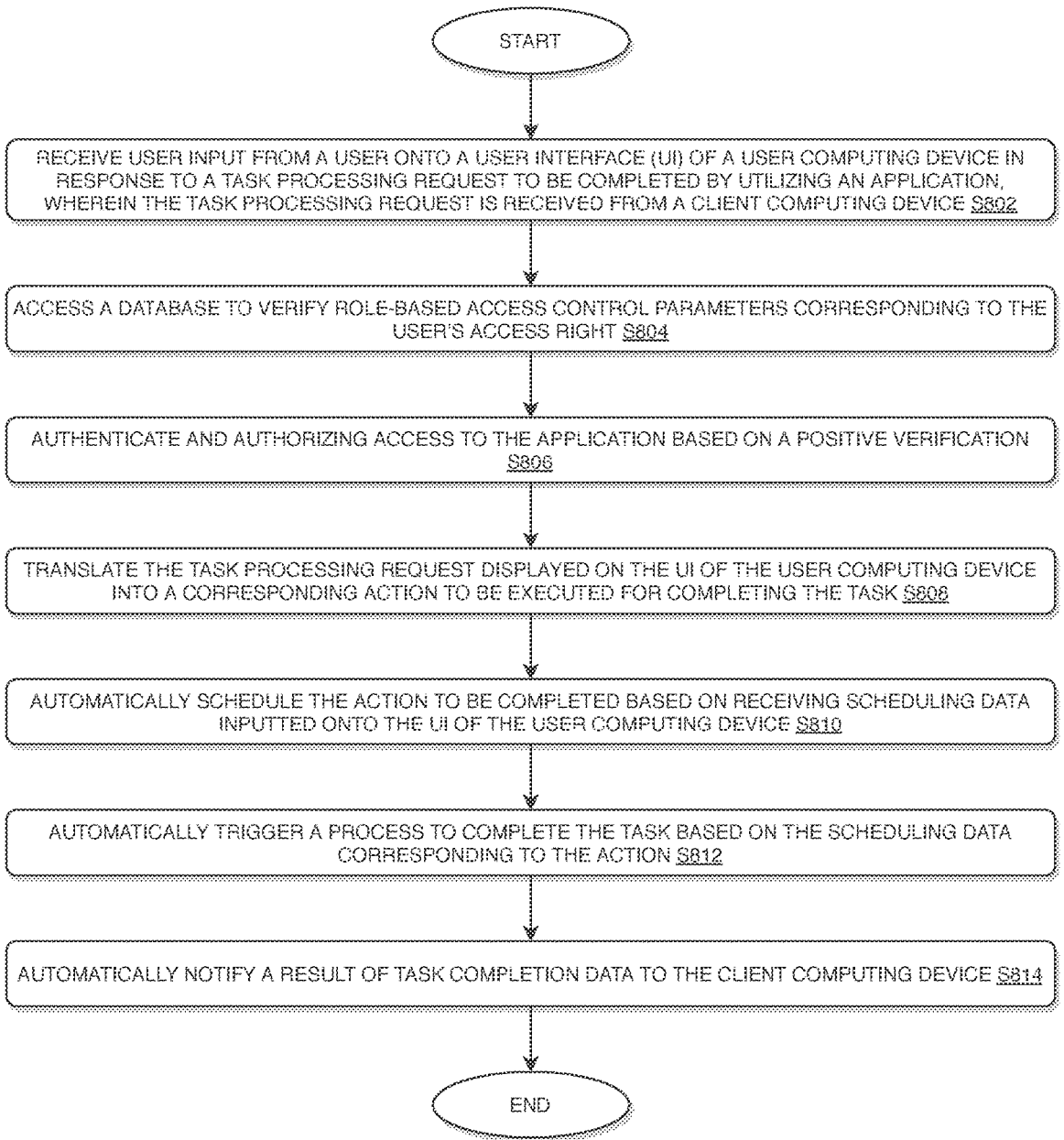
FIG. 8 illustrates a flow diagram for implementing an orchestration and scheduling framework module in accordance with an exemplary embodiment.

FIG. 8 illustrates a flow diagram for implementing an orchestration and scheduling framework module by utilizing one or more processors and one or more memories in accordance with an exemplary embodiment.

In the process 800 of FIG. 8, at step S802, user input may be received from a user onto a user interface (UI) of a user computing device in response to a task processing request to be completed by utilizing an application. The task processing request is received from a client computing device.

According to exemplary embodiments, at step S804, a database may be accessed to verify role-based access control parameters corresponding to the user's access right.

According to exemplary embodiments, at step S806, access to the application may be authenticated and authorized based on a positive verification.

According to exemplary embodiments, at step S808, the task processing request displayed on the UI of the user computing device may be translated into a corresponding action to be executed for completing the task.

According to exemplary embodiments, at step S810, the process 800 may further include automatically scheduling the action to be completed based on receiving scheduling data inputted onto the UI of the user computing device.

According to exemplary embodiments, at step S812, the process 800 may further include automatically triggering a process to complete the task based on the scheduling data corresponding to the action.

According exemplary embodiments, at step S814, the process 800 may further include automatically notifying a result of task completion data to the client computing device.

According to exemplary embodiments, the process 800 may further include integrating the UT with a plurality of different configurable dashboards providing a centralized monitoring and analytics capabilities.

According to exemplary embodiments, the process 800 may further include: creating additional parameters on the fly to process the task request based on links provided by the plurality of different configurable dashboards depending on a desired use case; and automatically completing the task by implementing the additional parameters.

According to exemplary embodiments, the process 800 may further include: receiving and scheduling a plurality of tasks; batch processing the plurality of tasks, and monitoring status of each task by utilizing the plurality of different configurable dashboards.

According to exemplary embodiments, the process 800 may further include: simultaneously accessing a plurality of different infrastructures for completing the plurality of tasks based on corresponding scheduling data.

According to exemplary embodiments, the process 800 may further include: configuring the application by utilizing principles of modularity, loose coupling, and reusability that renders high degree of plug-ability within the application and reusability of developed modules with any other application.

According to exemplary embodiments, the process 800 may further include: collecting real time execution data corresponding to the task from the application and from other system outside of the application; and monitoring, in real time, activities of task processing from within and outside of the system boundary based on the real time execution data According to exemplary embodiments, the process 800 may further include: configuring the application in a manner such that the application can support execution of automation tasks in either client-server (un-attended) mode or standalone client (attended) mode.

According to exemplary embodiments, a non-transitory computer readable medium may be configured to store instructions for automatic orchestration and scheduling of task processing as disclosed with respect to FIGS. 1-8. According to exemplary embodiments, the instructions, when executed, may cause a processor embedded within the OSFM 406 or the OSFD 402 to perform the following: causing a receiver to receive user input from a user onto a user interface (UI) of a user computing device in response to a task processing request to be completed by utilizing an application, wherein the task processing request is received from a client computing device; accessing a database to verify role-based access control parameters corresponding to the user's access right; authenticating and authorizing access to the application based on a positive verification; translating the task processing request displayed on the UI of the user computing device into a corresponding action to be executed for completing the task; automatically scheduling the action to be completed based on receiving scheduling data inputted onto the UI of the user computing device; automatically triggering a process to complete the task based on the scheduling data corresponding to the action, and automatically notifying a result of task completion data to the client computing device. The processor may be the same or similar to the processor 104 as illustrated in FIG. 1 or the processor embedded within OSFD 202, OSFD 302, OSFM 306, OSFD 402, and OSFM 406.

According to exemplary embodiments, the instructions, when executed, may further cause the processor 104 to perform the following: integrating the UI with a plurality of different configurable dashboards providing a centralized monitoring and analytics capabilities.

According to exemplary embodiments, the instructions, when executed, may further cause the processor 104 to perform the following: creating additional parameters on the fly to process the task request based on links provided by the plurality of different configurable dashboards depending on a desired use case, and automatically completing the task by implementing the additional parameters.

According to exemplary embodiments, the instructions, when executed, may further cause the processor 104 to perform the following: receiving and scheduling a plurality of tasks; batch processing the plurality of tasks; and monitoring status of each task by utilizing the plurality of different configurable dashboards.

According to exemplary embodiments, the instructions, when executed, may further cause the processor 104 to perform the following: simultaneously accessing a plurality of different infrastructures for completing the plurality of tasks based on corresponding scheduling data.

According to exemplary embodiments, the instructions, when executed, may further cause the processor 104 to perform the following: configuring the application by utilizing principles of modularity, loose coupling, and reusability that renders high degree of plug-ability within the application and reusability of developed modules with any other application.

According to exemplary embodiments, the instructions, when executed, may further cause the processor 104 to perform the following: collecting real time execution data corresponding to the task from the application and from other system outside of the application; and monitoring, in real time, activities of task processing from within and outside of the system boundary based on the real time execution data.

According to exemplary embodiments, the instructions, when executed, may further cause the processor 104 to perform the following: configuring the application in a manner such that the application can support execution of automation tasks in either client-server (un-attended) mode or standalone client (attended) mode.

According to exemplary embodiments as disclosed above in FIGS. 1-8, technical improvements effected by the instant disclosure may include platforms for automatic orchestration and scheduling of task processing, thereby allowing accelerated automation of manual tasks performed by users that can be managed and monitored either remotely or locally, but the disclosure is not limited thereto, but the disclosure is not limited thereto. According to exemplary embodiments as disclosed above in FIGS. 1-8, technical improvements effected by the instant disclosure may further include platforms that also provide reusable automation capability that can be easily plugged with any application/software suite, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatic orchestration and scheduling of task processing by utilizing one or more processors and one or more memories, the method comprising:
receiving user input from a user onto a user interface (UI) of a user computing device in response to a task processing request to be completed by utilizing an application, wherein the task processing request is received from a client computing device;

accessing a database to verify role-based access control parameters corresponding to the user's access right;

authenticating and authorizing access to the application based on a positive verification;

translating the task processing request displayed on the UI of the user computing device into a corresponding action to be executed for completing the task;

automatically scheduling the action to be completed based on receiving scheduling data inputted onto the UI of the user computing device;

automatically triggering a process to complete the task based on the scheduling data corresponding to the action;

automatically notifying a result of task completion data to the client computing device;

integrating the UI with a plurality of different configurable dashboards for providing a centralized monitoring and analytics capabilities;

receiving and scheduling a plurality of tasks;

batch processing the plurality of tasks; and monitoring status of each task by utilizing the plurality of different configurable dashboards; and simultaneously accessing a plurality of different infrastructures for completing the plurality of tasks based on corresponding scheduling data.

2. The method according to claim 1, further comprising:
creating additional parameters on the fly to process the task request based on links provided by the plurality of different configurable dashboards depending on a desired use case; and
automatically completing the task by implementing the additional parameters.

3. The method according to claim 1, wherein the plurality of different infrastructures include one or more of the following: a cloud-based infrastructure and a virtual server infrastructure.

4. The method according to claim 1, further comprising:
configuring the application by utilizing principles of modularity, loose coupling, and reusability within the application and reusability of developed modules with any other application.

5. The method according to claim 1, further comprising:
configuring the application in a manner such that the application can support execution of automation tasks in either client-server in an un-attended mode or stand-alone client in an attended mode.

6. The method according to claim 1, further comprising:
collecting real time execution data corresponding to the task from the application and from other system outside of the application; and
monitoring, in real time, activities of task processing based on the real time execution data.

7. The method according to claim 1, further comprising:
providing a command line interface to generate base orchestrator template with required dependencies and core functionality, wherein the required dependencies and core functionality includes credential management, logging, and integration with code quality tools.

8. A system for automatic orchestration and scheduling of task processing, comprising:
a receiver configured to receive user input from a user onto a user interface (UI) of a user computing device in response to a task processing request to be completed by utilizing an application, wherein the task processing request is received from a client computing device; and a processor operatively connected with the receiver via a communication network, wherein the processor is configured to:
access a database to verify role-based access control parameters corresponding to the user's access right;
authenticate and authorize access to the application based on a positive verification;
translate the task processing request displayed on the UI of the user computing device into a corresponding action to be executed for completing the task;
automatically schedule the action to be completed based on receiving scheduling data inputted onto the UI of the user computing device;
automatically trigger a process to complete the task based on the scheduling data corresponding to the action;
automatically notify a result of task completion data to the client computing device;
integrate the UI with a plurality of different configurable dashboards for providing a centralized monitoring and analytics capabilities;
receive and schedule a plurality of tasks;
batch process the plurality of tasks;
monitor status of each task by utilizing the plurality of different configurable dashboards; and
simultaneously access a plurality of different infrastructures for completing the plurality of tasks based on corresponding scheduling data.

9. The system according to claim 8, wherein the processor is further configured to:
create additional parameters on the fly to process the task request based on links provided by the plurality of different configurable dashboards depending on a desired use case; and
automatically complete the task by implementing the additional parameters.

10. The system according to claim 8, wherein the plurality of different infrastructures include one or more of the following: a cloud-based infrastructure and a virtual server infrastructure.

11. The system according to claim 8, wherein the processor is further configured to:
configure the application by utilizing principles of modularity, loose coupling, and reusability within the application and reusability of developed modules with any other application.

12. The system according to claim 8, wherein the processor is further configured to:
configure the application in a manner such that the application can support execution of automation tasks in either client-server in an un-attended mode or stand-alone client in an attended mode.

13. The system according to claim 8, wherein the processor is further configured to:
collect real time execution data corresponding to the task from the application and from other system outside of the application; and
monitor, in real time, activities of task processing based on the real time execution data.

14. A non-transitory computer readable medium configured to store instructions for automatic orchestration and scheduling of task processing, wherein when executed, the instructions cause a processor to perform the following:
causing a receiver to receive user input from a user onto a user interface (UI) of a user computing device in response to a task processing request to be completed by utilizing an application, wherein the task processing request is received from a client computing device;

accessing a database to verify role-based access control parameters corresponding to the user's access right;

authenticating and authorizing access to the application based on a positive verification;

translating the task processing request displayed on the UI of the user computing device into a corresponding action to be executed for completing the task;

automatically scheduling the action to be completed based on receiving scheduling data inputted onto the UI of the user computing device;

automatically triggering a process to complete the task based on the scheduling data corresponding to the action;

automatically notifying a result of task completion data to the client computing device;

integrating the UI with a plurality of different configurable dashboards for providing a centralized monitoring and analytics capabilities;

receiving and scheduling a plurality of tasks;

batch processing the plurality of tasks;

monitoring status of each task by utilizing the plurality of different configurable dashboards; and simultaneously accessing a plurality of different infrastructures for completing the plurality of tasks based on corresponding scheduling data.

15. The non-transitory computer readable medium according to claim 14, wherein when executed, the instructions further cause the processor to perform the following:

creating additional parameters on the fly to process the task request based on links provided by the plurality of different configurable dashboards depending on a desired use case; and automatically completing the task by implementing the additional parameters.

16. The non-transitory computer readable medium according to claim 14, wherein when executed, the instructions further cause the processor to perform the following:

configuring the application by utilizing principles of modularity, loose coupling, and reusability that renders high degree of plug-ability within the application and reusability of developed modules with any other application.

17. The non-transitory computer readable medium according to claim 14, wherein when executed, the instructions further cause the processor to perform the following:

configuring the application in a manner such that the application can support execution of automation tasks in either client-server in an un-attended mode or standalone client in an attended mode.

18. The non-transitory computer readable medium according to claim 14, wherein when executed, the instructions further cause the processor to perform the following:

collecting real time execution data corresponding to the task from the application and from other system outside of the application; and monitoring, in real time, activities of task processing based on the real time execution data.

19. The non-transitory computer readable medium according to claim 14, wherein when executed, the instructions further cause the processor to perform the following:

providing a command line interface to generate base orchestrator template with required dependencies and core functionality, wherein the required dependencies and core functionality includes credential management, logging, and integration with code quality tools.

20. The system according to claim 8, wherein the processor is further configured to:

provide a command line interface to generate base orchestrator template with required dependencies and core functionality, wherein the required dependencies and core functionality includes credential management, logging, and integration with code quality tools.

* * * * *